June 1, 1965 J. A. SONDERMAN 3,186,611
GAME CALL HOLDERS
Filed June 5, 1961
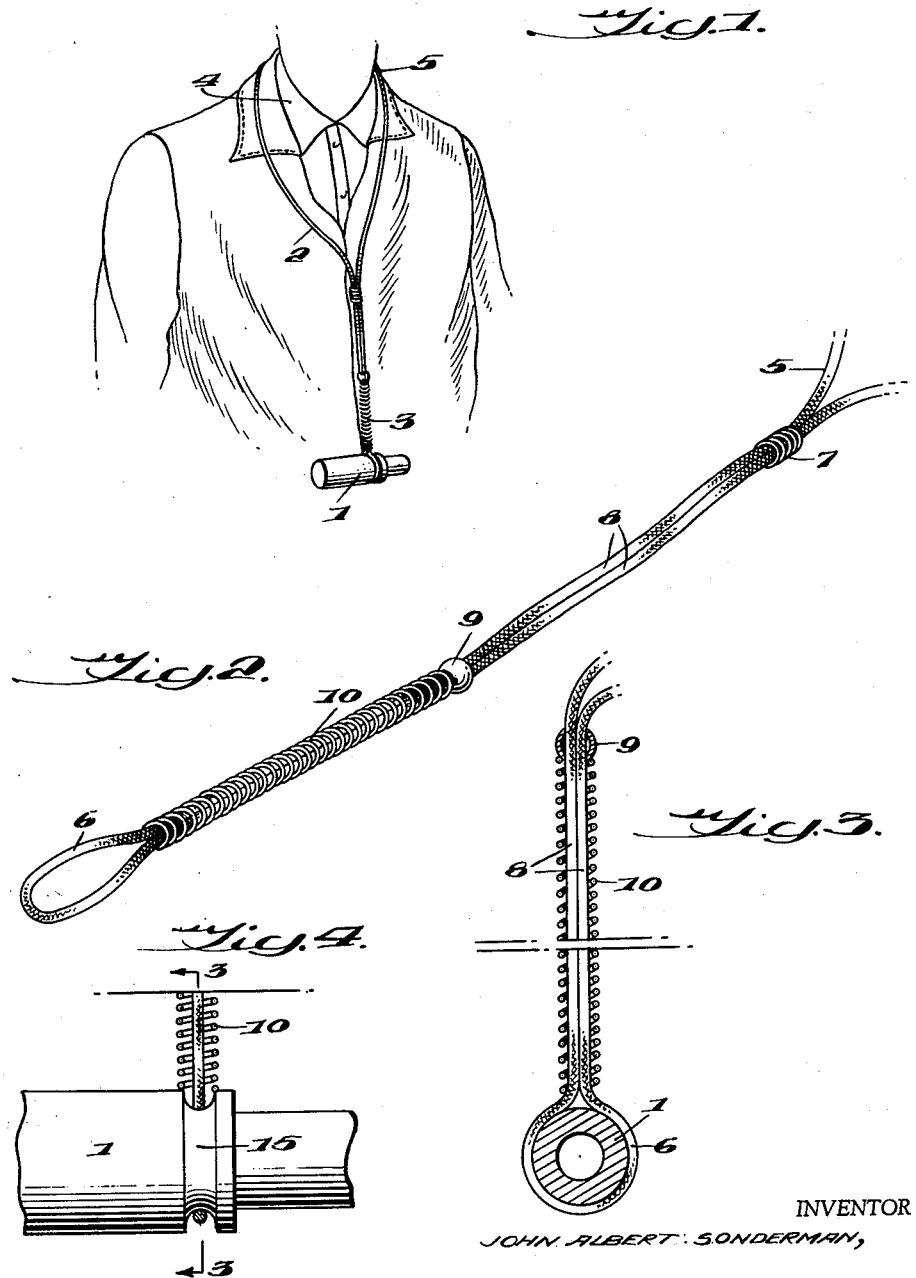
INVENTOR
JOHN ALBERT SONDERMAN,
BY Stone & Mack
ATTORNEYS

3,186,611
GAME CALL HOLDERS

John Albert Sonderman, South Pekin, Ill., assignor to Philip S. Olt Company, Pekin, Ill., a corporation of Illinois
Filed June 5, 1961, Ser. No. 115,007
2 Claims. (Cl. 224—5)

This invention relates to lanyards of the type adapted to be slung about the neck or shoulders of a person and including means for readily detachably connecting the lanyard to an article for carrying the latter.

Lanyards of this type usually comprise a length of flexible material doubled on itself or connected end to end to provide a bight or loop at one end for encircling the neck or other body portion. The opposite end of the lanyard usually has any suitable means such as a snap hook or hook for detachably connecting the lanyard to the article carried thereby. Such lanyards may include means for varying the size of the bight.

More particularly the invention relates to the type of lanyard intended to be employed with a game call so that the latter when carried by a hunter may be available for instant use.

In hunting, as for ducks, the hunter frequently utilizes a duck call comprising an instrument which, when blown properly, produces a call attractive to ducks. Thus, when the hunter sights a group of ducks, he utilizes the call to attract the ducks to his area. It is desirable to dispose the call on the person of the hunter so that it is instantly available for use, and to that end it is customary to support it on the end of a lanyard worn about the hunter's neck. To secure the call to the lanyard, such calls conventionally are provided with annular grooves extending about the mid-portion thereof so that a cord or a portion of the lanyard may be tied or otherwise secured therearound.

The principal feature of the invention is the provision of means for connecting a game call provided with an external annular groove to a lanyard in a quickly adjustable manner, said means having a new and improved coaction with the game call.

A further object is to provide in such a lanyard, improved means for securing the lanyard against maladjustment on the game call after the same has been attached thereto.

Another feature is the provision of a lanyard comprising a flexible cord having a loop or bight portion secured annularly around the game call in the groove, and a compressible spring member adjacent said bight portion to maintain the bight portion or loop portion in the groove.

Still another feature is that the compressible spring member adjusts the size of the bight or loop portion so that it is maintained smaller than the diameter of the groove in the game call.

Other objects and advantages will be readily apparent to those skilled in the art upon reference to the attached drawing in connection with the following specification wherein the invention is shown, described and claimed.

In the drawing:

FIGURE 1 is a perspective view showing a game call secured by the lanyard means embodying the invention, arranged around the hunter's neck, the hunter being shown fragmentarily;

FIGURE 2 is a perspective view showing the lanyard;

FIGURE 3 is a sectional view taken on line 3—3 of FIGURE 4; and

FIGURE 4 is a side view of the game call, with a portion of the game call and lanyard means broken away.

In the embodiment of the invention as disclosed in the drawing, a game call 1, such as a duck call, is shown to be secured to a lanyard 2 by a quickly adjustable means generally designated 3. The lanyard is arranged to extend around the neck 4 of the hunter so that the game call is retained directly in front of the hunter for instant availability. The lanyard that has proven well-suited in practice is made of a flexible "polyethylene" material and simulates a braided cord having no ends; the lanyard forming a complete endless loop. Thus it might be said that provision is made for two bights 5 and 6; bight 5 being the neck bight and bight 6 being the game call bight. The neck bight 5 may be varied in size if desired by means of a keeper 7 consisting of a flexible coil spring which surrounds the juxtaposed or doubled portion 8 of the lanyard above an abutment member or bead 9 which is firmly secured to the juxtaposed or doubled portion 8 by crimping the metal of which the bead is composed.

As viewed in FIGURE 2, the lanyard is provided with a second keeper or adjusting member 10 which surrounds the juxtaposed or doubled portion 8 and consists of a coiled spring of substantial length, one end of which is caused to abut against the abutment member or bead 9, the other end lying closely adjacent to the bight 6.

The game call 1 is provided with an annular groove 15 disposed around a mid-portion thereof.

When it is desired to place the lanyard 2 on the game call, the hunter grasps the bight 6 adjacent the second keeper 10 with one hand, compressing the second keeper 10 with the other hand and thence placing the bight 6 over the game call anchoring the same in the annular groove 15 upon release of the second keeper 10. In other words, the coiled spring 10 is first compressed against the bead 9, thereby forming a large bight 6 and, when the coiled spring is released, the bight 6 becomes smaller and accommodates itself to the circumference of the groove 15, since the spring is then in abutting relationship with the game call and the bead 9.

The lanyard has many uses other than the use just described. It can be employed equally as well for holding referees' whistles, sportsmen's smoking pipes, and the like.

While one embodiment of the invention has been shown and described, it is to be understood that it is capable of many modifications. Changes, therefore, in the construction and arrangement may be made without departing from the spirit and scope of the invention as defined in the appended claims.

The inventor claims:

1. For use with a game call having an external annular groove around the mid-portion thereof and intended to be connected thereto by an adjustable lanyard bight positioned in said groove, a lanyard adapted to be worn around the neck of a user, said lanyard comprising an unbroken loop of flexible, tubular cording having a neck bight portion and a game call bight portion, said neck bight portion being formed and made variable by a first slidable adjustable keeper embracing juxtaposed portions of said cording, said game call bight portion being formed and made variable by a second slidable lengthwise adjustable keeper of a substantial length and embracing juxtaposed portions of said cording, said second keeper abutting an abutment member fixedly securing said juxtaposed portions together and positioned between said first and second keepers, said second keeper being contractably adjustable against said abutment to provide a game call bight portion that may be passed around the mid-portion of said game call and when expandably adjustable providing a bight portion of a diameter conforming to the circumference of said annular groove thus providing a connecting means.

2. The device of claim 1 wherein said first slidable adjustable keeper is a coiled spring and said second slidable adjustable keeper is a coiled contractable and expandable spring.

References Cited by the Examiner

UNITED STATES PATENTS

| | | | |
|---|---|---|---|
| 1,230,726 | 6/17 | Krause | 294—100 |
| 1,298,061 | 3/19 | Kruse | 24—260 |
| 2,911,694 | 11/59 | Seron | 224—519 |

HUGO O. SCHULZ, *Primary Examiner.*

MORRIS W. FRITZ, MORRIS TEMIN, *Examiners.*